United States Patent [19]

Hubbs et al.

[11] Patent Number: 5,563,239
[45] Date of Patent: Oct. 8, 1996

[54] COMPOSITION AND PROCESS FOR THE PRODUCTION OF POLY(3-HYDROXYALKANOATES)

[75] Inventors: John C. Hubbs; Marti N. Harrison, both of Kingsport, Tenn.

[73] Assignee: Eastman Chemical Company, Kingsport, Tenn.

[21] Appl. No.: 336,620

[22] Filed: Nov. 9, 1994

[51] Int. Cl.$^6$ .................................................. C08G 63/06
[52] U.S. Cl. .......................... 528/361; 528/354; 521/48
[58] Field of Search .................................. 528/361, 354; 521/48

[56] References Cited

U.S. PATENT DOCUMENTS

| | | | |
|---|---|---|---|
| 5,281,691 | 1/1994 | Hubbs et al. | 528/361 |
| 5,334,698 | 8/1994 | Witholt et al. | 528/354 |

OTHER PUBLICATIONS

IARC Monographs on the Evaluation of the Carcinogenic Risk of Chemicals in Man: Betabutyrolactone, VII, 225 (1976).
Y. Hori et al. in *Macromolecules*, V26, 5533 (1993).
D. Seebach et al., *Angew. Chem. Int. Ed. Engl.*, V32, p. 487, (1993).
N. C. Billingham et al., *J. Organometal. Chem.*, v. 341, p. 84, (1988).
M. Bodanszky in "Active Esters in the Peptide Synthesis", pp. 105–196, *The Peptides*, 1, E. Gross, J. Meienhofer, editors, Academic Press, New York, New York, 1981.
L. M. Jackman, S. Sternhell, *Nuclear Magnetic Resonance Spectroscopy in Organic Chemistry*, Second Edition, p. 133, Pergamon Press, New York, N.Y., 1969.
T. Harada and Y. Izumi, *Chemistry Letters*, 1195 (1978).
Makromol Chem, Rapid Commun. 14, 783–790 (1993) Synthesis of biodegradable polyesters by polycondensation of methyl (R)-3-hydroxybutyrate and methyl (R)-3-hydroxy-valerate Kobayashi et al.

*Primary Examiner*—Paul R. Michl
*Assistant Examiner*—Duc Truong
*Attorney, Agent, or Firm*—Mark A. Montgomery; Harry J. Gwinnell

[57] ABSTRACT

Disclosed is a novel process for the production of poly(3-hydroxyalkanoates) through the condensation polymerization of esters of 3-hydroxyalkanoic acids at a temperature of about 90° to 200° C. in the presence of a titanium catalyst. Also is disclosed a novel composition that is a poly(3-hydroxyalkanoate) containing predominantly carboxylic ester end groups.

20 Claims, 2 Drawing Sheets

COMPOSITION AND PROCESS FOR THE PRODUCTION OF POLY(3-HYDROXYALKANOATES)

FIELD OF THE INVENTION

This invention relates to a novel process for the production of poly(3-hydroxyalkanoates). More particularly, the present invention relates to the production of poly(3-hydroxyalkanoates) through the condensation polymerization of esters of 3-hydroxy-alkanoic acids.

BACKGROUND OF THE INVENTION

Poly(3-hydroxyalkanoates) are naturally occurring thermoplastic polymers currently isolated from bacteria and other microorganisms. Unlike many thermoplastic polymers, poly(3-hydroxyalkanoates) and in particular poly(3-hydroxybutyrate) have been shown to be biodegradable and environmentally non-persistent. Poly(3-hydroxyalkanoates) have the additional feature of being both thermally and hydrolytically unstable and thus can degrade without microbial intervention. The high cost of processing and isolating poly(3-hydroxy-alkanoates) derived from natural sources however, has inhibited the wide spread use of these biodegradable polymers in commercial applications.

Poly(3-hydroxyalkanoates) can be prepared by the polymerization of beta-substituted-beta-propiolactones. A summary of this approach along with its strengths and weaknesses is disclosed in U.S. Pat. No. 5,281,691, the disclosure of which is incorporated herein by reference in its entirety. While potentially offering a low cost route to poly(3-hydroxyalkanoates), the preparation and polymerization of beta-substituted-beta-propiolactones has several problems which have hindered the commercialization of this process. While not well established, there is reason to be concerned over the toxicity of beta-substituted-beta-propiolactones. The possible hazards associated with beta-butyrolactone are disclosed in IARC Monographs on the Evaluation of the Carcinogenic Risk of Chemicals in Man: Betabutyro-lactone, V11, 225 (1976). Significant expense could also be incurred in the manufacture of beta-substituted-beta-propiolactones. When producing isotactic polyhydroxybutyrate from beta-butyrolactone it is desirable to have a source high in (S)-beta-butyrolactone or (R)-beta-butyrolactone as discussed in U.S. Pat. No. 5,281,691 and Y. Hori et. al. in *Macromolecules*, V26, 5533 (1993). Significant expense is incurred in the manufacture of these optically pure or optically enriched monomers.

On the other hand, 3-hydroxyalkanoic acids and 3-hydroxyalkanoic esters are easily prepared from esters of acetoacetic acid and other sources and attempts have been made to use these as a raw material for the production of poly(3-hydroxyalkanoates) by condensation polymerization. However, as described by D. Seebach et. al., *Angew. Chem. Int. Ed. Enql.*, V32, p. 487, (1993) and N. C. Billingham et. al., *J. Organometal. Chem.*, V341, p 84, (1988) 3-hydroxybutyric acid and esters derived therefrom undergo elimination of the 3-hydroxy substituent under conditions of condensation polymerization. This undesirable elimination process thus seems to limit the molecular weight of condensation polymer to very low values.

In light of the above it would be very desirable to be able to synthetically produce poly(3-hydroxyalkanoates), particularly if it is by a low cost method. It would also be very desirable to be able to produce poly(3-hydroxyalkanoates) in a nontoxic process. It would further be very desirable to be able to produce crystalline poly(3-hydroxyalkanoates).

SUMMARY OF THE INVENTION

The process for the production of poly(3-hydroxyalkanoates) according to the present invention comprises reacting, in the presence of a titanium catalyst, at a temperature of about 90° to 200° C., a hydroxyalkanoate ester of the formula:

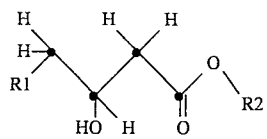

to produce a poly(3-hydroxyalkanoate) of the formula:

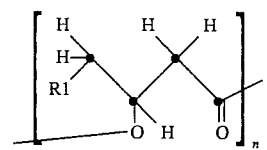

wherein R1 is selected from the group consisting of hydrogen, alkyl, substituted alkyl, aryl alkyl, aryl, and substituted aryl; R2 is selected from the group consisting of alkyl, substituted alkyl, aryl alkyl, aryl, and substituted aryl; and n is greater than 10.

DETAILED DESCRIPTION OF THE INVENTION

Figure 1:
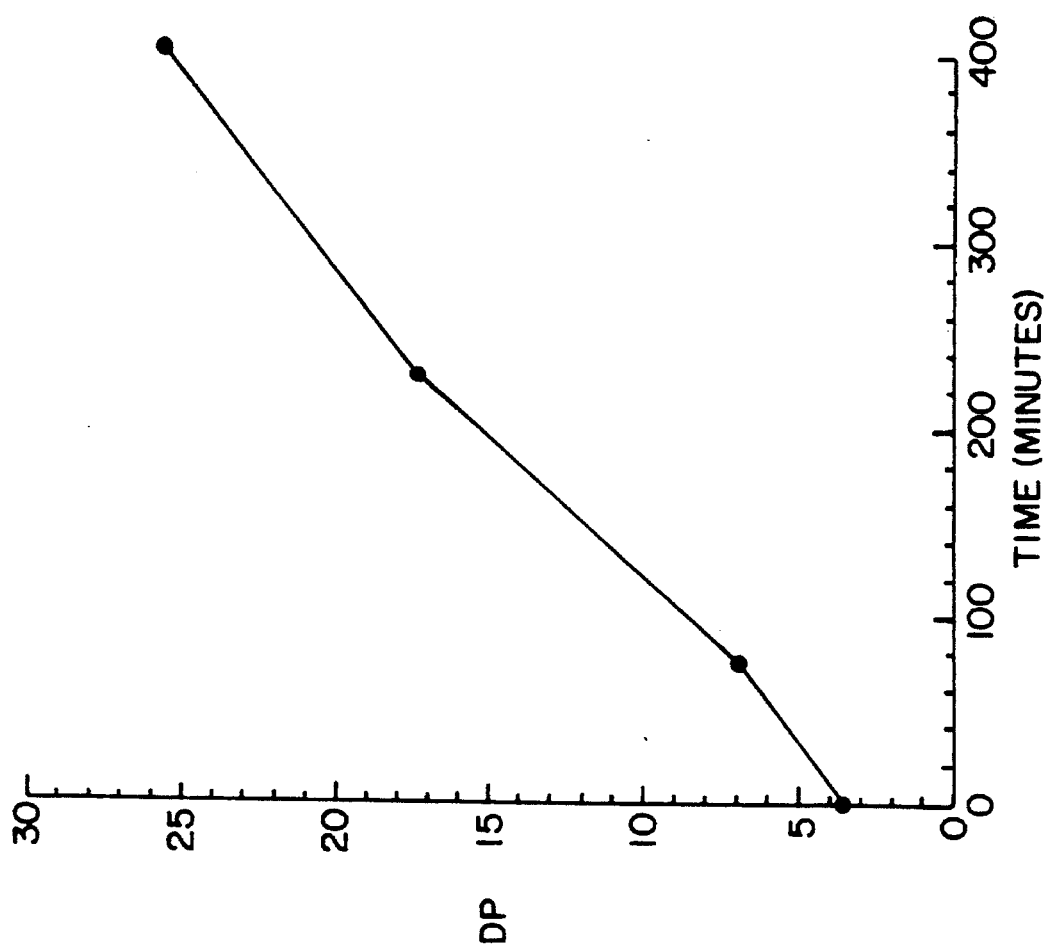
FIG. 1 illustrates the polymerization of oligomeric poly(3-hydroxybutyrate)(PHB) to higher molecular weight polymer under high vacuum. The degree of polymerization is plotted against time under a vacuum of 0.5 mm Hg at 140° C. (see Example 4).

The present inventors have unexpectedly discovered that in a narrow temperature range and with a narrow specific group of catalysts, esters of 3-hydroxyalkanoic acids undergo condensation polymerization rather than elimination. Furthermore, the present inventors have unexpectedly discovered that through application of vacuum and with prolonged exposure within the narrow temperature range a high molecular weight polymer can be formed.

The catalyst used in the process according to the present invention is a titanium containing species, preferably a titanium (IV) species. The more preferred titanium catalysts employed in the process according to the present invention, due to their effectiveness and availability, are the titanium (IV) alkoxides, with titanium tetraisopropoxide being most preferred. The preferred catalysts are all believed to be capable of forming alkoxide complexes with the hydroxy alkanoate esters and intermediates of the present invention.

Additionally, the titanium catalyst used in the process according to the present invention could be modified with conventional modifiers, such as a phosphoric modifier. A specific example of a phosporic modifier is phosphoric acid.

Catalysts can be added prior to and sometimes during reaction at levels which preferably range between one tenth part per million (0.1 ppm) and 1 weight percent of titanium, based on the total contents of the reactor. More preferred catalyst levels range between 0.5 and 1000 ppm of titanium, even more preferably between 1 and 600 ppm of titanium, with the most preferred catalyst levels ranging between 50 and 400 ppm of titanium. At catalyst levels much below 0.1 to 0.5 ppm of titanium the reaction proceeds at such a slow pace to not be practical whereas at amounts much above 1000 ppm of titanium the rate of reaction is not significantly increased to justify the use of expensive catalyst. In addition, at higher catalyst levels increased rates of polymer decomposition may occur.

The reaction process according to the present invention is preferably run neat, in the absence of solvent, in order to enhance the rate of reaction. However, solvents can optionally be used and include the non-nucleophilic solvents. These are typically aprotic solvents which are absent reactive functionality. Such preferred solvents include, for example, dialkyl ethers such as dibutylether, toluene and other aromatic hydrocarbons, tetrahydrofuran, and hexane and other nonaromatic hydrocarbons.

The process according to the present invention is conducted at a temperature in the range of about 90° to 200° C. The preferred temperature range for this condensation polymerization reaction is between 120° and 190° C. The more preferred temperature range for this condensation polymerization is between 140° and 180° C., with a temperature range between about 140° and 160° C. being most preferred. At temperatures below 90° C. the reaction is slow and not very useful, however at temperatures much above 200° C. the rates of degradation of the polymer are so high as to be intolerable. More tolerable rates of decomposition are below 180° C. and even better below 160° C.

The inventors have discovered that the polyhydroxybutyrate undergoes a beta-elimination process to provide a high proportion of crotonate end groups and a correspondingly low molecular weight for the polymer at temperatures of 180° C. or above. For very short reaction times this temperature upper limit can be as high 200° C. before the molecular weight of the polymer is too low to be useful. A similar process is believed to occur for other poly(3-hydroxyalkanoates).

The process for the production of poly(3-hydroxyalkanoates) according to the present invention comprises reacting, in the presence of a titanium catalyst at a temperature of about 90° to 200° C., a hydroxyalkanoate ester to produce a poly(3-hydroxy-alkanoate) of the formula:

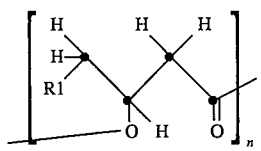

wherein R1 is hydrogen, alkyl, substituted alkyl, aryl alkyl, aryl, or substituted aryl. R1 is preferably hydrogen or straight chain alkyl, with hydrogen being most preferred. In the formula 1 above, n is greater than 10, preferably greater than 50 and more preferably in the range of 50 to 400.

The polymer of formula 1 can be a homopolymer, copolymer, terpolymer, or mixed polymer in which the R1 of differing repeat units can be the same or different. The degree of polymerization (n) is generally a function of reaction conditions. Typically higher n values are obtained at temperatures between 140° and 160° C. and on exposure of the polymerization mixture in the reactor to high vacuum (0.00001 to 10 mm Hg) for a significant period of time so as to provide exposure of the reaction mixture to adequate vacuum. This reactor residence time is generally above about 15 minutes (down to about 1 minute for continuous reactors), more preferably not less than one hour (batch) and not greater than 2 weeks. Extremely long reaction times are generally considered prohibitively expensive for operations in a production facility.

The degree of polymerization can thus be adjusted to fit the desired end use of the polymer. For low viscosity atactic polymeric plasticizers it is often desired that n be in the range of 10–100. For other applications and in particular for isotactic polymers of higher tensile strength, it is often desirable that the degree of polymerization be significantly higher, in the range of 100 to 1000. Degrees of polymerization with n values in excess of 1000 are desirable from a property standpoint, but are presently difficult to obtain and often require unacceptably long reaction times and result in difficult processing conditions due to the high viscosities which frequently result.

The vacuum applied to the polymerization reaction is generally in the range of about 100 to 0.00001 mm Hg, preferably about 50 to 0.0001 mm Hg, with about 10 to 0.01 mm Hg being most preferred due to the practical operating range.

It is also preferred that the process be conducted (preferably in the melt phase) with vigorous agitation under high vacuum to accelerate the rate of polymerization by providing more surface area exposure to the high vacuum conditions.

The hydroxyalkanoate ester used to produce the poly(3-hydroxyalkanoate) according to the process of the present invention is of the following formula:

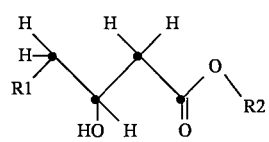

wherein R1 is hydrogen, alkyl, substituted alkyl, aryl alkyl, aryl, or substituted aryl and R2 is alkyl, substituted alkyl, aryl alkyl, aryl, or substituted aryl. Preferably R1 is hydrogen or straight chain alkyl with hydrogen being most preferred. Preferably R2 is C1–C6 linear alkyl or aryl with methyl or phenyl being most preferred.

The monomer 2 of the present invention can be either a racemic mixture of a single composition (same R1), or an optically enriched or enantiomerically pure sample of a single composition. Alternatively, the monomer 2 of the present invention can be a mixture of monomers (of differing R1) either as racemic mixtures or composed of enantiomerically pure or enriched components or mixtures thereof. For optically enriched or enantiomerically pure samples of formula 2, typically an isotactic or partially isotactic polymer of formula 1 results. For racemic mixtures of formula 2, typically an atactic polymer of formula 1 results.

The polymer produced according to the present invention was produced in the substantial absence of β-lactone which has previously been the monomer of choice for the manufacture of poly(3-hydroxyalkanoates) (see U.S. Pat. No. 5,281,691). The process of the present invention, because it uses esters of 3-hydroxyalkanoic acids as monomer, is unencumbered by traces of residual β-lactone monomer (i.e.

it was never introduced). Furthermore, the composition of formula 1 of the present invention contains few free carboxylic acid end groups (substantially free) but instead contains predominantly carboxylic ester end groups. Thus the polymer of formula 1 is preferably as follows, with R1, R2, and n as defined above:

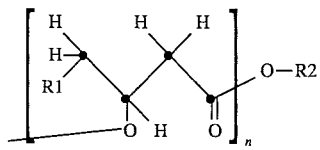

The resulting polymer of formula 1 thus has a lower acidity (few acid end groups) and hence is less prone to acid catalyzed decomposition. Furthermore, when R2 is aryl or an otherwise activating substituent, this novel composition of preferred formula 1 allows for further modification according to methods commonly used in the art with "active esters". Such active esters are well known in the peptide art and are also referred to as activating groups. See, for example, the examples described by M. Bodanszky in "Active Esters in the Peptide Synthesis", pp. 105–196, *The Peptides*, 1, E. Gross, J. Meienhofer, editors, Academic Press, New York, New York, 1981. Thus, when R2 is aryl, the reaction of composition 1 with nucleophiles would allow for further modification or elaboration of the carboxyterminus in the polymer.

When R1 of the preferred formula 1 above is hydrogen, the monomer (compound 2) is preferably optically enriched to about 60 to 100 percent, more preferably about 70 to 90 percent, thus producing a polymer that is at least partially isotactic.

The processes and compositions of the present invention are illustrated in the examples which follow. These examples only illustrate the present invention and are not intended to limit the reasonable scope thereof.

Experimental

All instrumental analyses were carried out in the research laboratories of Eastman Chemical Company (ECC) in either the Chemistry Division or Physical and Analytical Chemistry Division of ECC.

Proton nuclear magnetic resonance (NMR) spectra were recorded on a Varian Gemini 300 NMR instrument operating at 300 MHz in proton mode or a JOEL GX-270 instrument operating at 270 MHz in proton mode. All spectra are referenced to tetramethylsilane (TMS) at 0 ppm unless otherwise noted. Proton NMR spectra were typically run at a concentration of 5 to 50 mg experimental compound per gram of solution. Proton and carbon chemical shifts are reported in parts per million (ppm). Proton and carbon coupling constants were measured directly from line spacings. Thus, in the proton NMR for ABX spin systems the reported Jax and Jbx may be slightly in error when va-vb/Jab approaches 2 (See L. M. Jackman, S. Sternhell, *Nuclear Magnetic Resonance Spectroscopy in Organic Chemistry*, Second Edition, p 133, Pergamon Press, New York, N.Y., 1969). Coupling constants are reported as measured. The accuracy of reported coupling constants is assumed to be no less than three times the digital resolution. The linewidth of TMS at half height (resolution enhanced) is reported for all cases in which the line width exceeded six times the digital resolution.

Mass spectra (MS) were obtained using a VG Analytical Ltd. Model ZAB-1F Mass Spectrometer in EI (electron impact), fast atom bombardment (FAB, Xenon gas) or FD (field desorption) mode. Gas chromatography mass spectroscopy (GCMS) and accurate mass measurements (exact mass) were conducted using a VG 70-SEQ instrument equipped with a 30 meter DB5 capillary column (from J and W Scientific) using helium carrier gas.

Trace metal analyses were obtained by ICP (inductively coupled plasma) on a Perkin Elmer ICP/6000 instrument.

Glass transitions (Tg) and melting points (Tm) were obtained on a DuPont 2100 Differential Scanning Calorimeter (DSC). The Tm values were obtained on the first scan with 10 mg sample size and a scan rate of 20° C./minute under nitrogen. Tg values were obtained on the second run, as compared to an indium standard, also using a scan rate of 20° C./min.

GPC. data were acquired on a Waters Model 150 C gel permeation chromatograph. The mobile phase was tetrahydrofuran (THF). The molecular weights are reported in polystyrene equivalents.

Methyl 3-hydroxybutyrate was prepared by catalytic hydrogenation of methyl acetoacetate in the presence of Raney Nickel and hydrogen at pressures of approximately 1000 psi and at temperatures of approximately 60° C.

Methyl 3-hydroxybutyrate was fractionally distilled prior to use and was stored under an inert atmosphere of argon or nitrogen in oven dried flasks.

Unless otherwise specified, all reactions were carried out under an inert atmosphere of argon or nitrogen and were stirred magnetically.

Unless otherwise specified, degree of polymerization (DP) for (R,S)-poly(3-hydroxybutyrate) (PHB) was obtained by proton NMR by measuring the area for methine protons of hydroxybutyrate units which were attached via an acyl linkage to the oxygen on the 3-position (approximately 5.3 ppm) and by measuring the area for methine protons of residues which contained hydroxy end groups (approximately 4.2 ppm).

Unless otherwise specified, all polymer samples of PHB reported in the following examples provided proton NMR spectra consistent with either oligomeric or polymeric PHB. The spectra for such samples have been previously reported in U.S. Pat. No. 5,281,691.

EXAMPLE 1

This example demonstrates that a low molecular weight oligomer of poly(3-hydroxybutyrate) can be formed at ambient pressure and at temperatures of 140° C. using a titanium catalyst system.

Titanium isopropoxide (0.4 ml, 1.3 millimole, 100 ppm Ti) was added via syringe to methyl (R,S)-3-hydroxybutyrate (633 g, 5.36 moles). The resulting solution was heated at 140° C. for 200 minutes with distillative removal of the generated methanol. Proton NMR analysis of the resulting oligomer revealed a degree of polymerization of 1.81. Metal analysis revealed the presence of 109 ppm of titanium. The resulting oligomer was passed through a wiped film still (Pope Scientific) at a wall temperature of approximately 210° C. (1 mm Hg) to remove volatile components. The resulting viscous, undistilled residue (192 g) had a degree of polymerization as measured by proton NMR of 3.48.

EXAMPLE 2

This example demonstrates that (R,S)-poly(3-hydroxybutyrate) of moderate DP can be formed at reduced pressure and at temperatures of 140° C. using a titanium catalyst system.

The viscous undistilled residue from Example 1 (192 g, DP 3.48, 513 ppm Ti) was heated at 140° C. under vacuum (0.5 mm Hg) for 200 minutes. Volatile components were removed by distillation into a distillation receiver (micro glassware, 14/20 joints). The resulting highly viscous residue was shown to have a DP of 21.0 by proton NMR. Although detectable, crotonate end groups were significantly less than 0.5% of the polymer residues.

EXAMPLE 3

This example demonstrates the general reproducibility of the polymerization of methyl hydroxybutyrate to form poly(3-hydroxybutyrate).

An oligomeric sample of (R,S)-poly(3-hydroxybutyrate) was prepared from methyl (R,S)-3-hydroxybutyrate as in Example 1. Thus, poly(3-hydroxybutyrate) of DP of approximately 4.1 was heated for 400 minutes at 140° C. (approximately 0.5 mm Hg). Proton NMR analysis of the resulting material provided a calculated DP of 21.8 on analysis of the methine region (DP based on hydroxyl end groups) and a DP of 18.6 on comparison of the methine and methyl ester regions (DP based on methyl ester end groups). GPC analysis (relative to polystyrene standards) provided a calculated number average molecular weight for this sample of 1414.6 (polydispersity =2.4) which corresponds to a DP of 16.4 (polystyrene equivalents). Upon metal analysis the titanium content in this material analyzed at 387 ppm.

EXAMPLE 4

This example demonstrates that a polymer of high molecular weight can be prepared by extending polymerization times.

A prepolymer of DP 3.4 was prepared as in Example 1 and found to contain 313 ppm titanium on metal analysis. The viscous residue was heated at 140° C. under vacuum (0.5 mm Hg) for 400 minutes. Aliquots were removed at 75 minutes, 240 minutes and 400 minutes and analyzed for DP by proton NMR. (Due to the weak signal at 400 minutes for methine hydrogens on the hydroxy-containing end residues, the DP at 400 minutes was taken by ratioing the area of all methine protons by one third of the area for the methyl ester end group.) FIG. 1 shows a plot of DP as a function of time for this example. The near linearity of this plot suggests that very high DP's can be obtained at long reaction time.

It is additionally believed that more vigorous stirring and improved vacuums would accelerate the rate of polymerization by providing more surface area exposure to the high vacuum conditions.

EXAMPLE 5

This example compares titanium and antimony for their effect as catalysts in the oligomerization of methyl 3-hydroxybutyrate.

Figure 2:
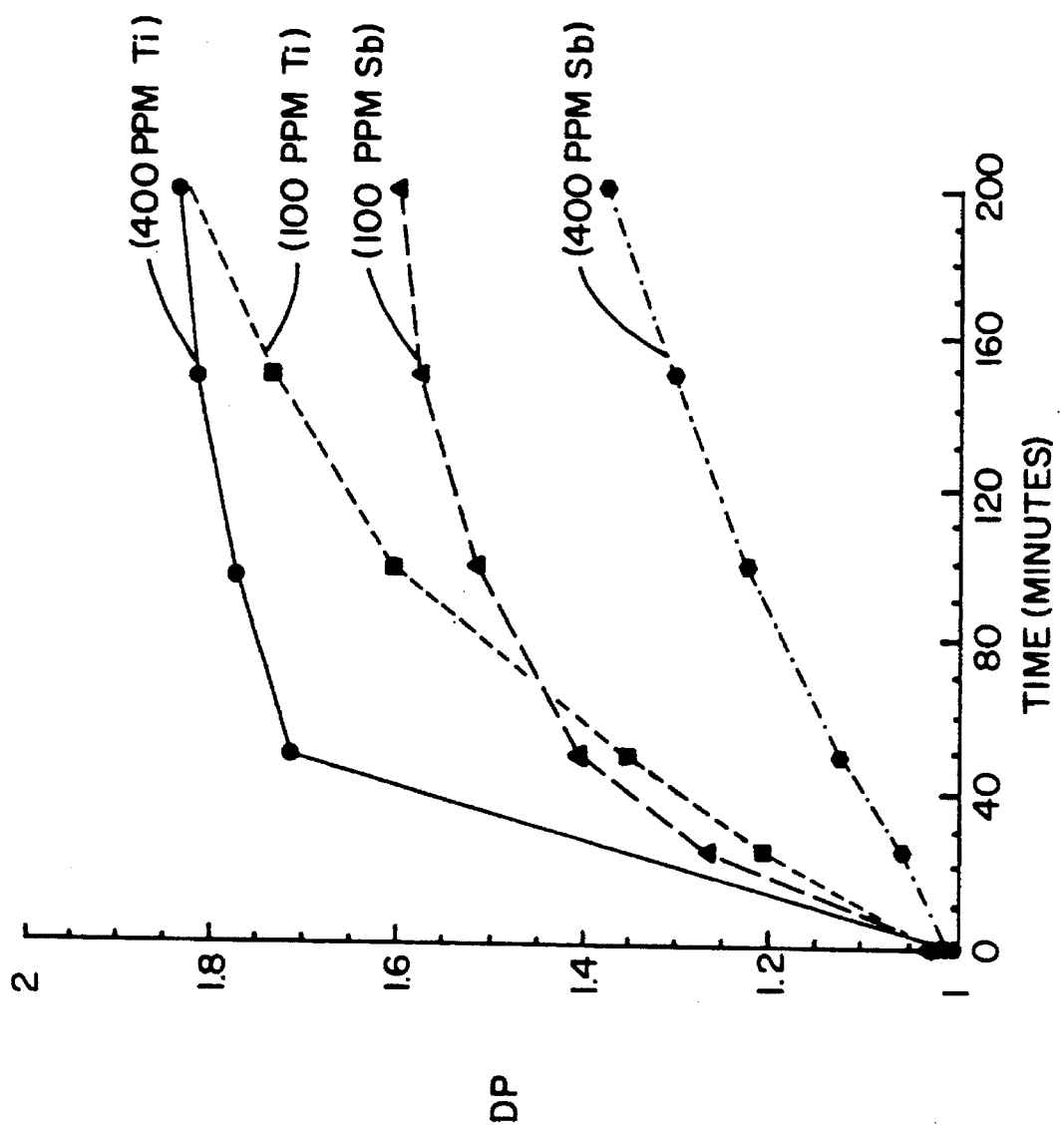
FIG. 2 illustrates the degree of polymerization of the prepolymer of PHB under atmospheric pressure at 140° C. as a function of time, catalyst (Ti verses Sb), and catalyst amount (see Example 5).

Reactions were carried out as in Example 1 (140° C., atmospheric pressure). Reactions were initiated by introduction of the appropriate amount of catalyst (titanium was introduced as titanium tetraisopropoxide and antimony was introduced as antimony triethoxide) to a solution of methyl (R,S)-3-hydroxybutyrate. Antimony and titanium were both introduced at levels of 100 and 400 ppm of the respective metals. Aliquots were removed from the reactions at 25, 50, 100, 150 and 200 minutes and analyzed by proton NMR for DP. FIG. 2 shows a plot of DP as a function time, catalyst and catalyst amount for this example. Higher DPs were obtained using titanium at 100 minutes and times thereafter.

EXAMPLE 6

This example demonstrates the preparation of optically enriched monomer, methyl (R)-3-hydroxy-butyrate. Raney Nickel modified with tartaric acid and sodium bromide was prepared according to the procedure of T. Harada and Y. Izumi, *Chemistry Letters*, 1195 (1978).

Methyl acetoacetate (250 ml) and methyl propionate (400 ml) were added to approximately 10 g of this L,L-tartaric acid/sodium bromide modified Raney Nickel in methyl propionate (under an atmosphere of argon). A small amount of acetic acid (4 ml) was then added to the resulting mixture. This reaction mixture was then added to a pressure vessel and the vessel was purged with nitrogen. The reaction vessel was pressurized to 800 psi with hydrogen and heated to 100° C. with vigorous stirring. The pressure was adjusted to 1300 psi hydrogen and stirring at 100° C. was continued for 24 hours. After cooling to room temperature, releasing the pressure in the vessel, and venting with nitrogen, the contents of the reaction vessel were carefully filtered through celite. Careful fractional distillation (3 foot packed column) first removed the methyl propionate solvent (approximately 100 mm Hg, <70° C.), next provided a mixed fraction of methyl acetoacetate and methyl (R)-3-hydroxy-butyrate (108.96 g, 8 mmHg, 60°–65° C. head temperature) and a fraction of purified methyl (R)-3-hydroxybutyrate (approximately 140 g, 8 mm Hg, 60°–65° C. head temperature). The identity of all samples were verified by proton NMR.

EXAMPLE 7

This example demonstrates a method to determine the enantiomeric excess of methyl (R)-3-hydroxybutryate.

A sample of enantiomerically enriched methyl (R)-3-hydroxybutyrate prepared as in Example 6 (2.53 g, 21 mmoles) was added via syringe to a reaction vessel containing (−)-menthol (25.4 g, 0,163 moles, 7.8 equivalents). This mixture was heated until a melt was produced (approximately 50° C.). Titanium isopropoxide (70 microliters, 0.24 millimoles, 400 ppm Ti) was added to the now molten mixture and subsurface introduction of argon was initiated via a glass pipette at a flow rate of 200 ml/minute. The reaction mixture was then heated at 160° C. with continuous subsurface introduction of argon for 2 hours at which point an additional charge of titanium isopropoxide was added (70 microliters). Methanol which was entrapped in the argon stream was continuously removed into a distillation receiver and a dry ice trap. After 4 additional hours of heating at 160° C., the reaction was terminated by allowing the mixture to cool to room temperature. Proton NMR analysis revealed that 65% of the methyl hydroxybutyrate had been converted to (−)-menthyl (R)-3-hydroxybutyrate.

A total of 150 mg of crude reaction product (obtained by reaction of enantiomerically enriched methyl (R)-3-hydroxybutyrate with menthol as described above) was purified by semipreparative HPLC in 2 injections (water/acetonitrile in a gradient to 100% acetonitrile, C-18 reverse phase column, Vydac(TM) 218TP1010). The peak corresponding to menthyl 3-hydroxybutyrate was collected and lyophilized. Analysis of the menthyl 3-hydroxybutyrate by carbon-13 NMR revealed that three of the carbon signals (40.9, 47.0, 64.3 ppm, CDCl3) were capable of distinguishing diastereomers with baseline separation. The major signals were assigned to (−)-menthyl (R)-3-hydroxybutyrate by comparison with an authentic sample (prepared by depolymerization of (R)-poly(3-hydroxybutyrate) of natural origin) and the minor signals were assigned to (−)-menthyl (S)-3-hydroxybutyrate. The % R isomer was thus determined to be 85.5% (standard deviation of 0.55%, obtained by averaging peak intensities) in this synthetic mixture of diastereomers. This corresponds to an enantiomeric excess of 71%. A sample of racemic methyl (R,S)-3-hydroxybutyrate was analyzed in a similar fashion and was found to contain 50.8% (standard deviation of 0.51) of the R isomer (as would be expected from the composition). A sample of methyl (R)-3-hydroxybutyrate which was obtained by depolymerization of (R)-poly(3-hydroxybutyrate of natural origin was also analyzed by this method and provided no detectable (S)-isomer.

EXAMPLE 8

This example demonstrates the preparation of partially isotactic poly(3-hydroxybutyrate) via condensation polymerization of methyl (R)-3-hydroxy-butyrate (71% enantiomeric excess).

Titanium isopropoxide (0.185 ml, 0.622 millimole, 400 ppm Ti) was added via syringe to methyl (R)-3-hydroxybutyrate (73.74 g, 0.625 moles, 71%ee) which had been prepared according to the procedure of Example 6 and analyzed by the procedure of Example 7. The reaction mixture was heated at 140° C. for 45 minutes with distillative removal of the generated methanol. Heating was then continued for an additional 90 minutes under mild vacuum (200 mm Hg), an additional 60 minutes under moderate vacuum (20 mm Hg), and finally an additional 160 minutes under high vacuum (approximately 0.1 mm Hg). The reaction mass solidified on cooling. Proton NMR analysis revealed a degree of polymerization of 23. GPC analysis (relative to polystyrene standards) provided a calculated number average molecular weight for this sample of 1515 (polydispersity =2.6) which corresponds to a DP of 17.6 (polystyrene equivalents). Although detectable, crotonate end groups were significantly less than 0.5% of the polymer residues.

Tg (DSC): −11.7° C.

Tm (1) (DSC): 82.3° C. (5.6 cal/g)

Tm (2) (DSC): 103.9° C. (6.2 cal/g)

EXAMPLE 9

This experiment demonstrates the detrimental effect of attempting polymerizations to poly(3-hydroxybutyrate) at 180° C. for prolonged periods of time.

In this experiment, a distillate containing low molecular weight oligomer (methyl ester end groups) and methyl (R,S)-3-hydroxybutyrate was used (DP=1.59). A one liter reactor containing a thermowell was charged with oligomeric methyl (R,S)-3-hydroxybutyrate (DP 1.59, 589.82 g). Titanium isopropoxide (0.5 ml, 136 ppm Ti) was added to the reactor and the reaction was heated at 140° C. (100 mm Hg) for approximately 1 hour with removal of distillate into a distillation receiver. The vacuum was then lowered to 30 mmHg and the reaction temperature was maintained at 140° C. for an additional 40 minutes. A sample was withdrawn (approximately 1 ml) and the distillate weighed (142.6 g). Heating of the reaction was resumed and the vacuum was lowered to 3 mm Hg. Reaction was allowed to proceed for an additional 105 minutes, at which point the reaction was again sampled and the distillate weighed (30.8 g). The reaction was then reinitiated by heating to 180°–185° C. (approximately 1 mm Hg) for 30 minutes and then cooled (distillate=18.4 g). Proton NMR analysis of the polymeric residue at this point indicated a DP of approximately 13.7 (based on the methine and crotonate (methyl) regions) to 15.7 (based on the methine and methyl ester regions). Approximately 1% of the total polymer residues were determined to be crotonate end groups (on comparison of the crotonate (methyl) region to the methylene region of the NMR). The polymeric sample was then reheated at 175°–185° C. (0.2 mm Hg-0.5 mm Hg) for 210 minutes. The distillate was again weighed (9.0 g) and the reaction product (polymer) was analyzed by proton NMR. This polymer product was determined to contain 5.4% of the polymer residues as crotonate end groups (on integration and analysis of the crotonate (methyl) and methylene regions of the NMR). This high a percentage of crotonate end groups corresponds to an allowed maximum DP of 18.6. The DP was estimated on analysis of the methyl ester and methine regions of the NMR to be 19. Thus the molecular weight of the polymer was limited by crotonate end group formation. Measurable amounts of crotonic acid and crotonic acid esters were also observed in the later distillates.

EXAMPLE 10

This example demonstrates the preparation of phenyl (R,S)-3-hydroxybutyrate from beta-butyrolactone.

A 2-L, 3-neck flask was charged with phenol (422.24 g, 4.5 mole) and toluene (500 ml). The resulting solution was allowed to reflux through a Dean-Stark trap for 3.5 hours in order t6 azeotrophically remove any water which was introduced with the phenol. Approximately 100 ml of solvent was removed in this drying process. This solution was allowed to cool to approximately 40° C. Triethyl amine (9 ml, 0.065 mole) was then added to the reaction mixture and (R,S)-betabutyrolactone (200 ml, 2.45 mole) was subsequently added over a 30 minute period. The temperature of the reaction remained between 35° and 38° C. during the course of the addition of beta-butyrolactone. The reaction mixture was allowed to stir overnight without external heating. In the morning, the reaction mixture was heated to 70° C. for 8 hours. The reaction mixture was passed through a wiped film still (Pope Scientific) at an external wall temperature of 65°–90° C. (approximately 1 mm Hg) to remove the majority of solvent and some phenol. The material which did not distill (587.4 g) was passed through the still a second time at an external wall temperature of 85°–90° C. (0.5 mm Hg) to remove a portion of the remaining phenol. The material which did not distill (498.6 g) was passed through the still a third time at an external wall temperature of 140°–150° C. (0.3 mm Hg) to remove the remaining phenol and a significant portion of the product. The material which did not distill (138.5 g) was passed through the still a final fourth time at an external wall temperature of 120°–135° C. to provide a distilled sample (96.6 g) of phenyl (R,S)-3-hydroxybutyrate.

1H NMR (CDC13, digital resolution=0.14 Hz): 7.34–7.41 (m, 2H), 7.20–7.26 (m, 1H), 7.06–7.11 (m, 2H), 4.28–4.35 (m, 1H), 2.97 (bs, 1H(OH)), 2.75 (dd, J=16.6, 4.5, 1H), 2.69 (dd, J=16.6, 7.8, 1H), 1.30 (d, J=6.3, 3H). GCMS: M+=180

EXAMPLE 11

This example demonstrates the condensation polymerization of phenyl 3-hydroxy-butyrate.

A sample of phenyl (R,S)-3-hydroxybutyrate (approximately 96 g, 0.53 mole) prepared as in Example 10 was charged to a 100 ml flask equipped with a thermowell and a magnetic stirrer. Titanium isopropoxide (approximately 210 microlitres, 0.7 millimoles, and 350 ppm titanium) was added to this solution and the reaction was heated to 110°–120° C. under vacuum (4 mm Hg) for one hour. Distillate was removed through a small vigreux column into a distillation receiver (the distillate analyzed as phenol by proton NMR). The reaction was then cooled to room temperature and sampled (approximately 1 ml) for later analysis if necessary. The reaction mixture was then reheated to 120° C. for three hours (5 mm Hg) and the reaction was once again sampled. Proton NMR analysis revealed that the reaction mixture at this point no longer contained detectable amounts of monomer, phenyl (R,S)-3-hydroxybutyrate, and that the DP of the formed (R,S)-poly(3-hydroxybutyrate) was approximately 5. The polymerization was next heated at full vacuum (approximately 0.2 mm Hg) and 140° C. for eight hours. Proton NMR of the reaction mixture at this point revealed a DP of approximately 33 (upon comparison of the phenyl and methine regions). Approximately 1.1% of all polymer residues were determined to contain crotonate end groups which accounted for approximately one third of all the end groups. Analysis of the methine region and crotonate region (methyl group, 1.87 ppm, CDC13) provided a calculated DP of approximately 27–34 for this same sample.

We claim:

1. A process for the production of poly(3-hydroxyalkanoates) comprising reacting, in the presence of a titanium catalyst, at a temperature of about 90° to 200° C., a hydroxyalkanoate ester of the formula:

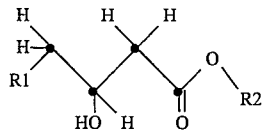

to produce a poly(3-hydroxyalkanoate) of the formula:

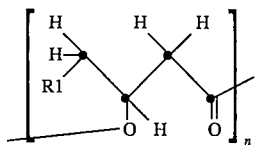

wherein R1 is selected from the group consisting of hydrogen, alkyl, substituted alkyl, aryl alkyl, aryl, and substituted aryl; R2 is selected from the group consisting of alkyl, substituted alkyl, aryl alkyl, aryl, and substituted aryl; and n is greater than 10.

2. The process according to claim 1 wherein said titanium catalyst is a titanium (IV) alkoxide.

3. The process according to claim 1 wherein said titanium catalyst is present during the reaction at a concentration of about 1 to 600 ppm based on the total contents of the reactor.

4. The process according to claim 1 wherein the reaction is run neat.

5. The process according to claim 1 wherein the reaction temperature is about 140° to 180° C.

6. The process according to claim 1 wherein the reaction is conducted under vacuum.

7. The process according to claim 6 wherein said vacuum is about 50 to 0.0001 mmHg.

8. The process according to claim 7 wherein the reaction is conducted for at least 15 minutes under vacuum.

9. The process according to claim 1 wherein the reaction is conducted in the melt phase.

10. The process according to claim 1 wherein the reaction is conducted with vigorous agitation.

11. The process according to claim 1 wherein R1 is selected from the group consisting of hydrogen and straight chain alkyls and R2 is selected from the group consisting of C1–C6 linear alkyls and aryls.

12. The process according to claim 1 wherein said hydroxyalkanoate ester is optically enriched.

13. A composition comprising the poly(3-hydroxyalkanoate) of the formula:

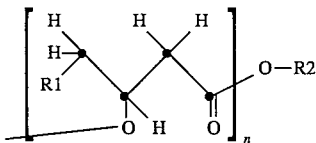

wherein R1 is selected from the group consisting of hydrogen, alkyl, substituted alkyl, aryl alkyl, aryl, and substituted aryl; R2 is selected from the group consisting of alkyl, substituted alkyl, aryl alkyl, aryl, and substituted aryl; and n is greater than 10; and wherein the composition contains predominantly carboxylic ester end groups.

14. The composition according to claim 13 wherein n is greater than 50.

15. The composition according to claim 13 wherein R1 is selected from the group consisting of hydrogen and straight chain alkyls and R2 is selected from the group consisting of C1–C6 linear alkyls and aryls.

16. The composition according to claim 13 wherein said poly(3-hydroxyalkanoate) is at least partially isotactic.

17. The composition according to claim 13 wherein said poly(3-hydroxyalkanoate) is poly(3-hydroxybutyrate).

18. The composition according to claim 17 wherein the composition is substantially free of β-lactone.

19. The composition according to claim 13 wherein said poly(3-hydroxyalkanoate) is substantially free of free carboxylic acid end groups.

20. The composition according to claim 13 wherein R2 is selected from the group consisting of methyl and phenyl.

* * * * *